(12) United States Patent
Pan et al.

(10) Patent No.: US 11,555,746 B2
(45) Date of Patent: Jan. 17, 2023

(54) REMOTE TEMPERATURE MONITORING SYSTEM

(71) Applicant: Sichuan Energy Internet Research Institute, Tsinghua University, Sichuan (CN)

(72) Inventors: Siming Pan, Sichuan (CN); Tun Li, Sichuan (CN); Dawei He, Sichuan (CN); Yi Liu, Sichuan (CN); Peng Xu, Sichuan (CN)

(73) Assignee: Sichuan Energy Internet Research Institute, Tsinghua University, Sichuan (CN)

( * ) Notice: Subject to any disclaimer, the term of this patent is extended or adjusted under 35 U.S.C. 154(b) by 262 days.

(21) Appl. No.: 16/956,583

(22) PCT Filed: May 25, 2018

(86) PCT No.: PCT/CN2018/088304
§ 371 (c)(1),
(2) Date: Jun. 20, 2020

(87) PCT Pub. No.: WO2019/119727
PCT Pub. Date: Jun. 27, 2019

(65) Prior Publication Data
US 2021/0208006 A1    Jul. 8, 2021

(30) Foreign Application Priority Data
Dec. 20, 2017 (CN) .......................... 201711381621.9

(51) Int. Cl.
G05B 19/042 (2006.01)
G01K 1/024 (2021.01)
G01K 1/02 (2021.01)

(52) U.S. Cl.
CPC ............. *G01K 1/024* (2013.01); *G01K 1/028* (2013.01)

(58) Field of Classification Search
CPC ......... G01K 1/024; G01K 1/028; G01K 1/026
See application file for complete search history.

(56) References Cited

U.S. PATENT DOCUMENTS 6,808,307 B1    10/2004 Aslan et al.

FOREIGN PATENT DOCUMENTS

| CN | 101853566 A | 10/2010 |
| CN | 101881671 A | 11/2010 |

(Continued)

*Primary Examiner* — An T Nguyen
(74) *Attorney, Agent, or Firm* — Novick, Kim & Lee, PLLC; Allen Xue

(57) ABSTRACT

A remote temperature monitoring system includes a temperature monitoring device and a remote monitoring platform. The temperature monitoring system uses a temperature acquisition sensor to process collected temperature data in a single-chip microcomputer, and then the processed data information is transmitted to a computer by the single-chip microcomputer. Monitoring software is installed in the computer. After the software obtains the data, the data are parsed, and then a temperature-time map is presented in a visual interface. At the same time, the temperature monitoring device also transmits the parsed data to the remote monitoring platform, thereby realizing remote monitoring of temperature. The system integrates multi-channel acquisition, remote monitoring, timed temperature measurement, real-time mapping, data storage, temperature alarm and other functions into one.

8 Claims, 2 Drawing Sheets

(56) References Cited

FOREIGN PATENT DOCUMENTS

| | | | |
|---|---|---|---|
| CN | 102243114 | A | 11/2011 |
| CN | 202676300 | U | 1/2013 |
| CN | 103398787 | A | 11/2013 |
| CN | 103512670 | A | 1/2014 |
| CN | 103542943 | A | 1/2014 |
| CN | 104344901 | A | 2/2015 |
| CN | 104406713 | A | 3/2015 |
| CN | 205642648 | U * | 10/2016 |
| CN | 106199416 | A | 12/2016 |
| CN | 206440390 | U * | 8/2017 |
| CN | 206514990 | U * | 9/2017 |
| JP | S61144520 | A | 7/1986 |
| JP | 3859952 | B2 | 12/2006 |
| KR | 100332835 | B1 | 4/2002 |
| WO | WO-2019000175 | A1 * | 1/2019 |

* cited by examiner

REMOTE TEMPERATURE MONITORING SYSTEM

FIELD OF THE INVENTION

The present invention relates to the technical field of temperature detection, and in particular to a remote temperature monitoring system.

DESCRIPTION OF THE RELATED ART

Temperature is a physical quantity that indicates the degree of heat and cold of an object or environment. Temperature is a very important and very common parameter in industrial and agricultural production. It plays a very important role in the fields of industry and agriculture, and it also has a wide range of applications.

With the continuous development of science and technology, the quality of production and life is constantly improving. The accuracy and reliability of temperature measurement and control play an important role in ensuring product quality, improving productivity, saving energy, reducing production costs and production safety.

In the existing temperature test system on the market, the price is generally high, the function is single, and remote multi-channel simultaneous monitoring may not be realized.

SUMMARY OF THE INVENTION

In order to solve the above problems, the present invention provides a remote temperature monitoring system, which comprises at least one temperature monitoring device and a remote monitoring platform in communication with the temperature monitoring device. Each temperature monitoring device corresponds to one port, and the temperature monitoring device communicates with the remote monitoring platform by means of the port.

The temperature monitoring device is distributed in each place to be monitored, and the temperature monitoring device comprises a plurality of temperature sensors, a single-chip microcomputer and a computer. Each temperature sensor is communicatively connected to the single-chip microcomputer, and the single-chip microcomputer is communicatively connected to the computer.

The temperature sensor is configured to collect the temperature of a temperature region to be collected. The computer is configured to save, process and display data transmitted by the single-chip microcomputer. The computer has a temperature-time curve display unit, a signal transmission unit, a sensor temperature display unit, a monitoring start button, a monitoring stop button and a data storage unit.

The first temperature-time curve display unit is provided with a curve display area and a selection box corresponding to each sensor, and the display area displays a temperature-time curve corresponding to the selected sensor.

The sensor temperature display unit is configured to display the real-time temperature detected by each sensor.

The signal transmission unit is configured to transmit related data to the remote monitoring platform. The monitoring start button and the monitoring stop button are respectively configured to start temperature monitoring and stop temperature detection.

The data storage unit is configured to save original data transmitted by the single-chip microcomputer and a temperature curve produced. During saving, if a save address has been selected in advance, such data and curve will be saved automatically, otherwise a prompt will be provided to save such data and curve manually.

The remote monitoring platform comprises a temperature-time curve display unit, a sensor selection unit, a sensor real-time temperature display unit and a port number setting unit.

The second temperature-time curve display unit is configured to display a temperature-time curve corresponding to one or several sensors according to the sensor set by the sensor selection unit.

The sensor selection unit is configured to select a sensor to be displayed in a relationship between temperature and time in the second temperature-time curve display unit.

The sensor real-time temperature display unit is configured to display the real-time temperature of each sensor of the selected temperature monitoring device.

The port number setting unit is configured to set a port number corresponding to the temperature monitoring device to be remotely monitored.

Further, the temperature monitoring device further comprises a timing unit for count up and count down.

Further, the temperature monitoring device further comprises a temperature unit conversion unit for converting the unit of temperature data between degrees Celsius and Fahrenheit.

Further, the temperature monitoring device further comprises a parameter setting unit configured to set parameters of the temperature monitoring device, the parameters comprising a port number of a port in which the temperature monitoring device communicates with the remote monitoring system, an upper temperature limit and a lower temperature limit of each sensor. A temperature alarm will be given when the temperature detected by the sensor is above the upper temperature limit or below the lower temperature limit.

Further, when the temperature detected by the sensor is above the upper temperature limit or below the lower temperature limit, a temperature alarm will be given.

Further, when the temperature alarm is given, an alarm sound given when the temperature is above the temperature upper limit is different from an alarm sound given when the temperature is below the temperature lower limit.

Further, the sensors of the temperature monitoring device are integrated on a temperature acquisition circuit board.

Further, a communication mode between the single-chip microcomputer and the computer is RS-232 serial communication.

The beneficial effects of the present invention are:

The system integrates the advantages of the existing temperature test system functions, and then combines practicality, cost, accuracy and other considerations. The system integrates multi-channel acquisition, remote monitoring, timed temperature measurement, real-time mapping, data storage, temperature alarm and other functions into one, and is a practical temperature remote monitoring system whose cost is controlled to a very low level, thereby saving costs and achieving intelligent monitoring of temperature.

DESCRIPTION OF THE PREFERRED EMBODIMENTS

Figure 1:
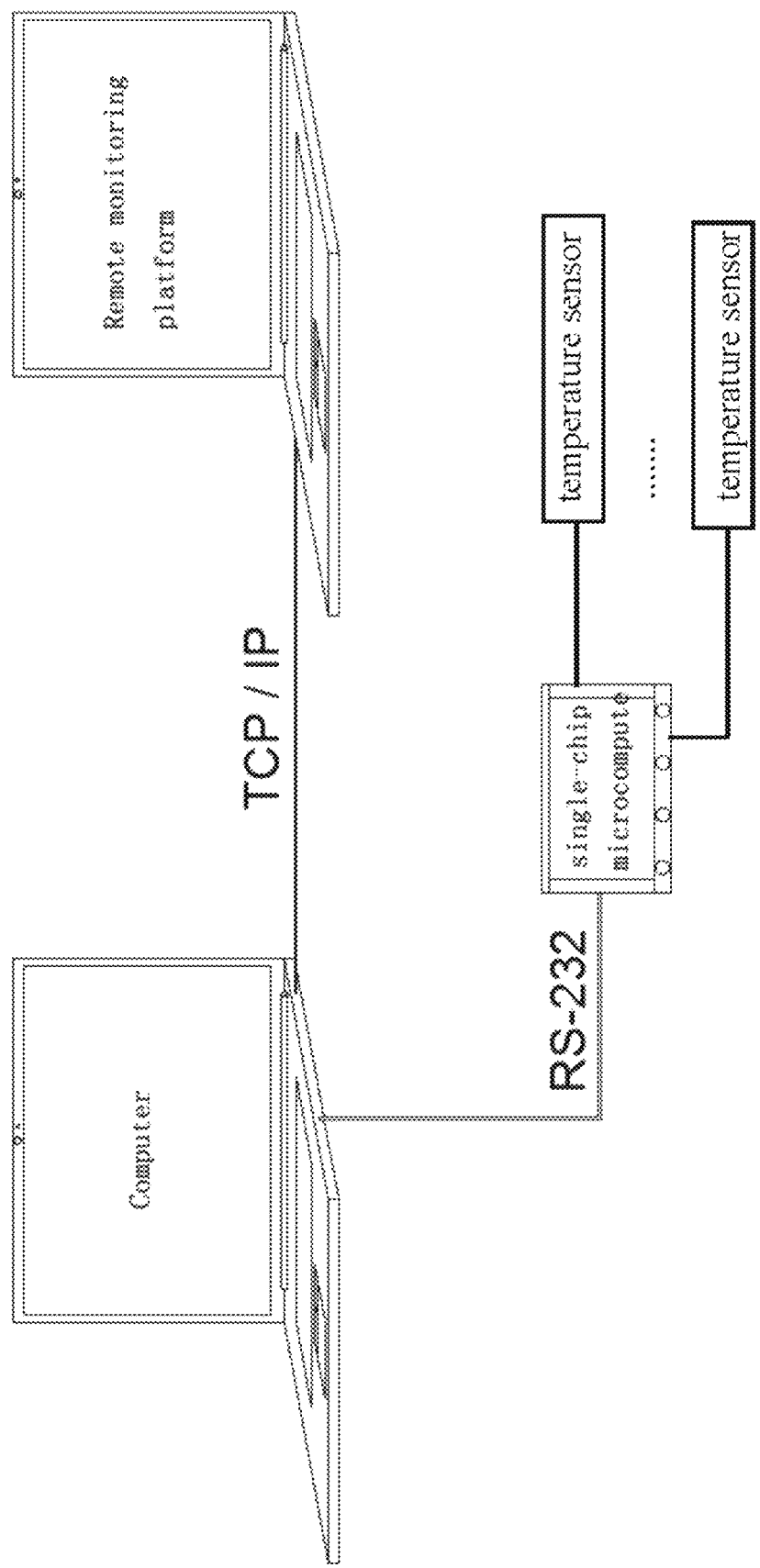
FIG. 1 is a schematic diagram of a remote temperature monitoring system in this disclosure.
Figure 2:
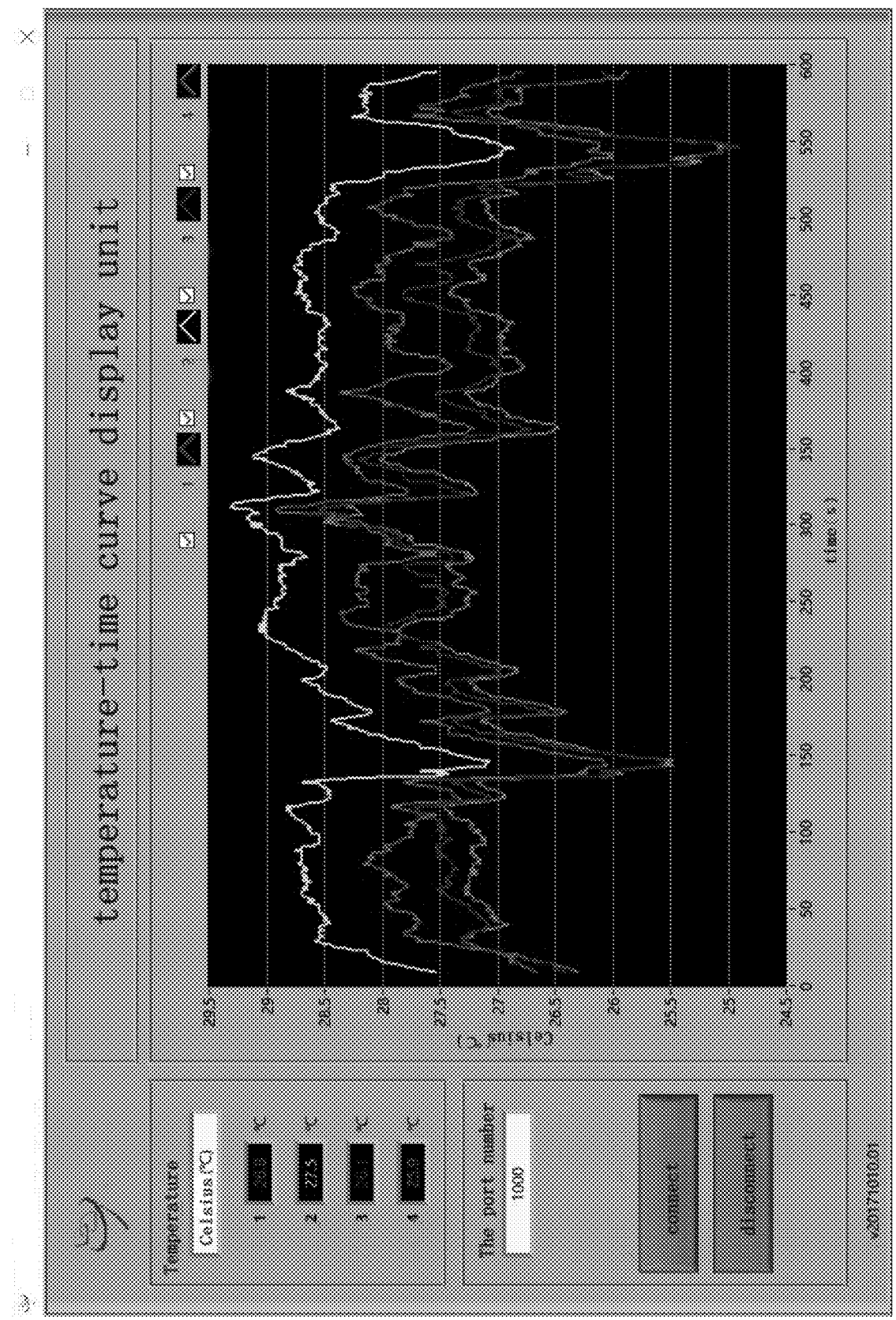
FIG. 2 shows an exemplary temperature-curve display unit, which has a curve display area, selection boxes, a sensor temperature display unit, a port number setting unit, a start monitoring button (connect), and a stop monitoring button (disconnect).

The design concept of the present invention is as follows: the system is divided into two parts: a temperature monitoring device and a remote monitoring platform. A temperature monitoring system uses a temperature acquisition sensor to process collected temperature data by means of a single-chip microcomputer, and then processed data information is transmitted to a computer by the single-chip microcomputer. Monitoring software is installed in the computer. After the software obtains the data, the data are parsed, and then a temperature-time map is drawn by means of a visual interface. At the same time, the temperature monitoring device also transmits the parsed data to the remote monitoring platform by means of a TCP/IP protocol, thereby realizing remote monitoring of temperature.

I: Remote Monitoring Platform

The remote monitoring platform comprises a temperature-time curve display unit, a sensor selection unit, a sensor real-time temperature display unit and a port number setting unit.

The port number setting unit is configured to set a port number corresponding to the temperature monitoring device to be remotely monitored. If a port number is filled in, then a corresponding temperature monitoring device is selected.

The sensor real-time temperature display unit is configured to display the real-time temperature of each sensor of the selected temperature monitoring device.

The sensor selection unit is configured to select a sensor to be displayed in a relationship between temperature and time in the second temperature-time curve display unit. It should be understood that the sensors belong to the selected temperature monitoring device.

The second temperature-time curve display unit is configured to display a temperature-time curve corresponding to the one or several sensors according to the sensor set by the sensor selection unit.

II: Temperature Monitoring Device

The temperature monitoring device is distributed in each place to be monitored, and is communicatively connected to the remote monitoring platform. Each temperature monitoring system has a unique IP address and a unique port number. The temperature monitoring device comprises a plurality of temperature sensors, a single-chip microcomputer and a computer.

Each temperature sensor is communicatively connected to the single-chip microcomputer, and the single-chip microcomputer is communicatively connected to the computer.

The temperature sensor is configured to collect the temperature of a temperature region to be collected. Sensors are integrated on a temperature acquisition circuit board. In the present embodiment, one temperature acquisition circuit board integrates four temperature sensors (the maximum interval between the sensors is about 10 cm), and the temperature data collected by the four temperature sensors are transmitted to the single-chip microcomputer in real time.

The single-chip microcomputer is configured to send to a computer by means of RS-232 serial communication.

The computer is configured to save, process and display the data transmitted by the single-chip microcomputer. The details are described below.

The computer has a timing unit, a temperature-time curve display unit, a temperature unit conversion unit, a parameter setting unit, a signal transmission unit, a sensor temperature display unit, a monitoring start button, a monitoring stop button and a data storage unit.

The timing unit is capable of displaying count up and count down. The count down is implemented as follows: when it is detected that the "count down" button is pressed, the time that has been currently run is first taken out and converted into seconds, and then set target time is subtracted from the current running time, and finally converted to the time format for display.

The temperature-time curve display unit is provided with a selection box and a curve display area which are in one-to-one correspondence to each sensor, and the display area displays a temperature-time curve corresponding to the selected sensor. Of course, the display unit of the temperature in the temperature axis in the curve is the selected temperature unit.

The temperature unit conversion unit is configured to convert the unit of temperature data between degrees Celsius and Fahrenheit.

The temperature unit selection unit is configured to select the temperature unit.

The parameter setting unit is configured to set the parameters of the temperature monitoring device.

The parameters comprise a port number of a port in which the temperature monitoring device communicates with the remote monitoring system, an upper temperature limit and a lower temperature limit of each sensor. A temperature alarm will be given when the temperature detected by the sensor is above the upper temperature limit or below the lower temperature limit. A temperature alarm may be configured to distinguish between a high temperature alarm or a low temperature alarm by using humming sound with different tones. The unit of the upper temperature limit and the lower temperature limit is the selected temperature unit.

The sensor temperature display unit is configured to display the real-time temperature detected by each sensor. Of course, the real-time temperature unit is also set by the temperature unit conversion unit.

The signal transmission unit is configured to transmit relevant data to the remote monitoring platform, and then the remote monitoring platform draws a temperature-time map on the received data. The signal transmission unit may use an existing wireless or wired signal transmission technology.

The data storage unit is configured to save original data transmitted by the single-chip microcomputer and a temperature curve produced. During saving, if a save address has been selected in advance, such data and curve will be saved automatically, otherwise a prompt will be provided to save such data and curve manually.

The monitoring start button and the monitoring stop button are respectively configured to start temperature monitoring and stop temperature detection.

We claim:

1. A remote temperature monitoring system, comprising at least one temperature monitoring device and a remote monitoring platform in communication with the at least one temperature monitoring device, wherein each temperature monitoring device corresponds to one port, and each temperature monitoring device communicates with the remote monitoring platform through the corresponding port;

each temperature monitoring device comprises a plurality of temperature sensors, a single-chip microcomputer and a computer, wherein each temperature sensor is communicatively connected to the single-chip microcomputer, and the single-chip microcomputer is communicatively connected to the computer;

each temperature sensor is configured to collect a temperature of a location being monitored, the computer is configured to save, process, and display data transmitted by the single-chip microcomputer, and the computer has a first temperature-time curve display unit, a signal transmission unit, a sensor temperature display unit, a monitoring start button, and a monitoring stop button;

the first temperature-time curve display unit is provided with a curve display area and a selection box corresponding to each temperature sensor, and the curve display area displays a temperature-time curve corresponding to one of the plurality of temperature sensors;

the sensor temperature display unit is configured to display the real-time temperature detected by each sensor;

the signal transmission unit is configured to transmit data to the remote monitoring platform;

the monitoring start button is configured to start temperature monitoring and the monitoring stop button is configured to stop temperature detection;

the remote monitoring platform comprises a second temperature-time curve display unit, a sensor selection unit, a sensor real-time temperature display unit, and a port number setting unit;

the second temperature-time curve display unit is configured to display a temperature-time curve corresponding to one or more sensors selected by the sensor selection unit;

the sensor selection unit is configured to select a sensor and to display a temperature-time curve of the selected sensor and time in the second temperature-time curve display unit;

the sensor real-time temperature display unit is configured to display the real-time temperature of each sensor of the at least one temperature monitoring device; and the port number setting unit is configured to set a port number corresponding to each temperature monitoring device to be remotely monitored.

2. The remote temperature monitoring system according to claim 1, wherein each temperature monitoring device further comprises a timing unit for count up and count down.

3. The remote temperature monitoring system according to claim 1, wherein each temperature monitoring device further comprises a temperature unit conversion unit for converting the unit of temperature data between degrees Celsius and Fahrenheit.

4. The remote temperature monitoring system according to claim 1, wherein each temperature monitoring device further comprises a parameter setting unit configured to set parameters of the temperature monitoring device, the parameters comprising a port number of a port through which the temperature monitoring device communicates with the remote monitoring platform, an upper temperature limit and a lower temperature limit of each sensor; and a temperature alarm is given when the temperature detected by the sensor is above the upper temperature limit or below the lower temperature limit.

5. The remote temperature monitoring system according to claim 4, wherein when the temperature detected by the sensor in the temperature monitoring device is above the upper temperature limit or below the lower temperature limit, a temperature alarm is given.

6. The remote temperature monitoring system according to claim 5, wherein an alarm sound is given when the temperature is above the temperature upper limit is different from an alarm sound given when the temperature is below the temperature lower limit.

7. The remote temperature monitoring system according to claim 1, wherein the plurality of sensors of each temperature monitoring device are integrated on a temperature acquisition circuit board.

8. The remote temperature monitoring system according to claim 1, wherein a communication mode between the single-chip microcomputer and the computer is RS-232 serial communication.

* * * * *